United States Patent
Schäfer

(10) Patent No.: US 7,612,952 B2
(45) Date of Patent: Nov. 3, 2009

(54) ADJUSTMENT MECHANISM

(75) Inventor: Andreas Schäfer, Hohenahr (DE)

(73) Assignee: Schmidt & Bender GmbH & Co. KG, Biebertal (DE)

(*) Notice: Subject to any disclaimer, the term of this patent is extended or adjusted under 35 U.S.C. 154(b) by 325 days.

(21) Appl. No.: 11/783,018

(22) Filed: Apr. 5, 2007

(65) Prior Publication Data
US 2008/0007843 A1    Jan. 10, 2008

(30) Foreign Application Priority Data
Apr. 7, 2006    (DE) ................. 10 2006 016 834

(51) Int. Cl.
G02B 7/02    (2006.01)

(52) U.S. Cl. ............... 359/813; 42/119; 356/247

(58) Field of Classification Search ............ 359/822, 359/811, 819, 813, 826; 42/119; 356/247
See application file for complete search history.

(56) References Cited

U.S. PATENT DOCUMENTS 7,458,180 B2 * 12/2008 Liang .................... 42/123

FOREIGN PATENT DOCUMENTS

DE    297 20 737 U1    2/1998

* cited by examiner

Primary Examiner—Timothy J Thompson
(74) Attorney, Agent, or Firm—Clark & Brody

(57) ABSTRACT

An adjustment mechanism to adjust a telescope sighting system comprises an adjusting muff rotatably supported on a connector part to drive the adjustment mechanism. The connector part is designed to transmit the motion of the adjusting muff to its connected components in order to adjust them. A first interlocking component is linked to the adjusting muff and fitted with first lock elements to constitute a first click array. A display means indicates the excursion of rotation of the adjusting muff, and a switch actuates the displays following a predetermined rotational excursion of the adjusting muff. A second interlocking component linked to the adjusting muff is provided with a second click array—different from the first click array—constituted by second lock components.

29 Claims, 7 Drawing Sheets

ADJUSTMENT MECHANISM

Figure 1:
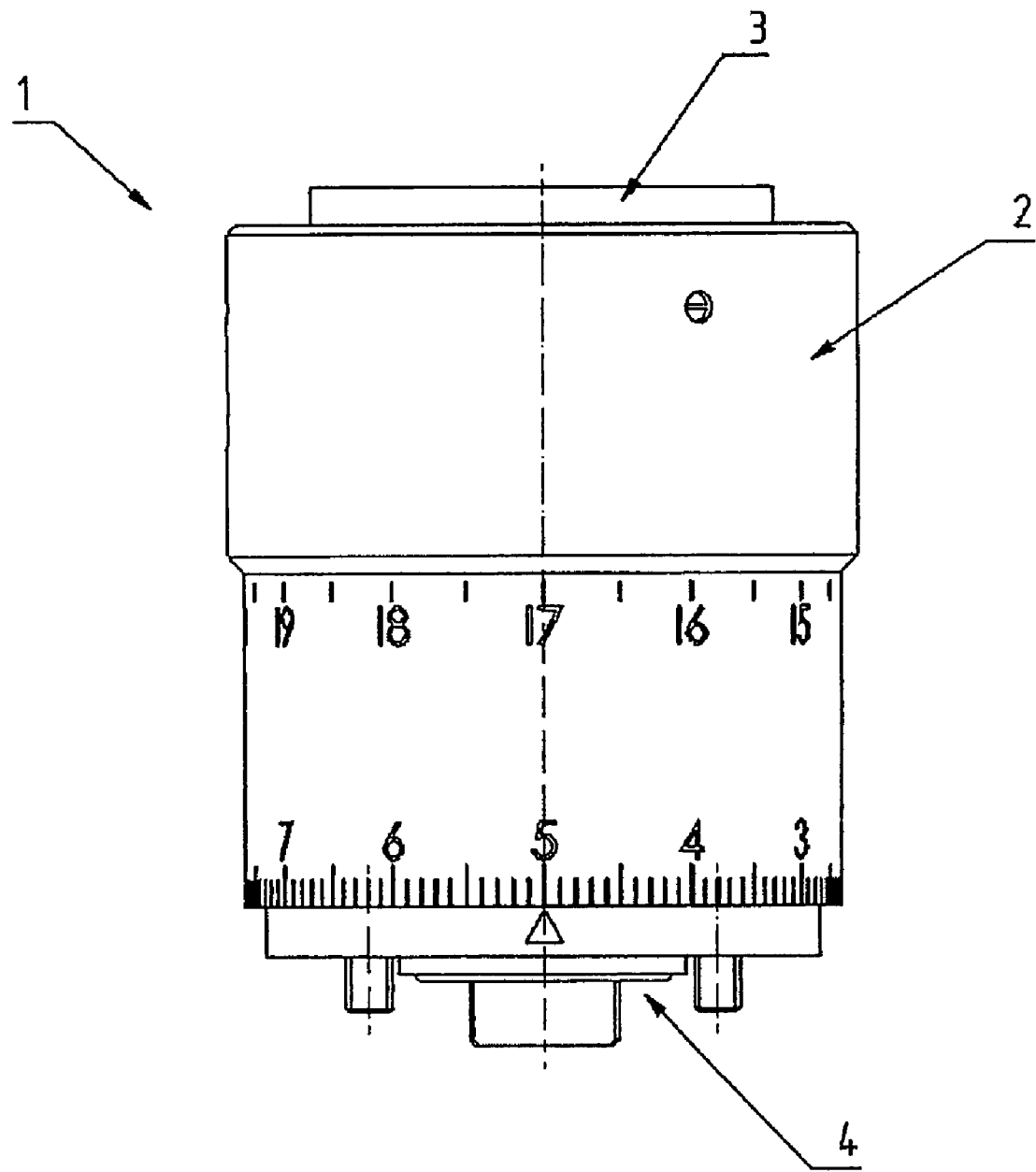

The present invention relates to an adjustment mechanism defined in claim 1, 2 and 3. Moreover the present invention relates to a retrofitting kit to retrofit adjustment mechanisms defined in claim 25. Again the present invention relates to a sighting telescope fitted with an adjustment mechanism defined in claim 26. The present invention also relates to a launch system fitted with a telescope defined in claim 27. Moreover the present invention relates to procedure to set adjustment mechanisms defined in claim 28.

Such mechanisms are widely used in advanced devices such as optical instruments, sighting telescopes and the like. Illustratively the German patent document DE 297 20 737 U1 describes a sighting telescope comprising a tubular housing fitted with mounts for a system of ocular and objective. A middle tube contains an optical inverting system and an associated telescope which is affixed firmly by the double pipe in a mount. At least two adjustment turrets are affixed externally and circumferentially 90° apart and are fitted with an indent ring or an adjusting muff. A threaded drive element is guided in slot in the tube body and against a spring force applies pressure at the front on said inverting system; said drive can be displaced to-and-fro in its longitudinal direction by rotating the detent ring or the adjusting muff.

In the conventional art, such a detent ring may rotate by as much as 270° and it exhibits fine stop positions of such resolution that when being rotated (clicked) it shall always advance by one step, whereby at a target distance of 100 m the change in target position will be 10 mm. A scale is affixed to the external turret to the outside of the adjusting turret and allows reading the correction. Depending on the graduation a white line marks for instance every second click element, and every tenth click element is shown by a digit or number. Such click detents are too coarse for sharpshooters or at shooting distances of 1,000 to 1,500 m because at such distances one click would corresponding to a shift in target position of 150 to 200 m. Refining the detent graduation is hardly feasible. On one hand critical discrimination between two detent positions would be ambiguous. On the other hand the space required to unambiguously read the scale from the outside and on the adjusting turrets is unavailable.

The rotational range of such adjustment mechanisms may a full turn, if so however the user then would not know in which range of adjustment this mechanism then would be at that particular time. Illustratively, as regards adjusting a sighting telescope, a detent ring may be designed to be revolvable several times, whereby the divisions could be used in multiple manner. In that case the marksman would not know which adjustment range he is in. Another drawback is incurred in that in some designs the height of the adjustment turrets varies and handling is adversely affected thereby.

A fine adjustment mechanism is known in the state of the art which is essentially in the form of a cylindrical assembly of an adjusting muff held on a threaded element and screwed into a lid fitted with a window, further a pendulum cylinder supported excentrically and axially in said adjusting muff and fitted with a cam means at its end face, and moreover a display drum supported between the lid and the adjusting muff, said drum being rotatably adjustable when the said adjusting muff is rotated by cam means relative to an adjusting pin guided in it near its periphery. In this design the setting is fitted with a scale or colored zone optically displaying how the direction of adjustment was set/adjusted relative to the initial position.

This design however incurs the drawback that the passive—i.e. an optical—not active illumination of a different setting on a multi-colored scale cannot be detected, or only with difficulty, by the operating personnel if in darkness unless there be additional illumination means. In certain applications, additional illumination may be inadmissible in whole or in part. Also additional spotting means that may be detected by other personnel than the user to display the adjusted position of the adjustment mechanism are inadmissible.

In order to carry out deliberate and readable adjustment in darkness, the user therefore must detect both the required number of detents that can be sensed by touch or in sensomotor manner that are carried out during adjustment until reaching a desired setting or fixing of the adjustment mechanism, that is, the user senses each detent action and on the basis of the number of such detent actions, is able to accurately correlate the number of detent actions at a given adjustment. Where fine resolution exists and related to it there is a large range of adjustments, there is danger that during adjustment the user shall count incorrectly whereby accurate adjustment shall be uncertain. In particular as regards click resolutions not restricted to a single use of the full range of clicks, that is, click arrays which are crossed several times when an adjustment is carried out, for instance in the case of click arrays configured on washer-like elements, which are unbounded, there is danger that the user shall count incorrectly due to the large number of click actions.

Accordingly it is an important objective of the present invention to create an adjustment mechanism offering a wide range of settings jointly with reliable and easier adjustments and which can be distinctly felt by the user even in darkness and which thereby averts erroneous settings.

This goal is attained by an adjustment mechanism defined in claim 1, 2 and 3.

Another objective of the present invention is to create a retrofitting kit for extant adjustment mechanisms, said kit allowing retrofitting conventional adjustment mechanisms with those of the present invention.

This goal is attained by a retrofitting kit defined in claim 25.

Still another objective of the present invention is improving the adjustment of sighting telescopes in darkness.

This goal is attained by a sighting telescope defined in claim 26.

Moreover the above goals are attained by a firing system defined in claim 27.

Moreover another goal of the present invention is to offer a method for setting an adjustment mechanism assuring reliable and easy setting even in darkness.

This goal is attained by a method defined in claim 28.

The present invention includes the technical disclosure regarding an adjustment mechanism to adjust components that can be connected to said mechanism and that in particular are used to adjust a telescope's sighting element such as a crosshair, where said mechanism includes an adjusting muff which is rotatably supported on a connector part and drives said adjustment mechanism, the connector part being designed to transmit the motion of said adjusting muff to components linked to said connector part to adjust said components, further regarding a first lock means linked to said adjusting muff and comprising lock elements to subtend a first click resolution, displays showing the magnitude of rotation of the adjusting cap, and a switch to actuate the displays following a predetermined rotation of said adjusting cap, further a second lock means linked to the adjusting muff being fitted with second lock elements subtending a second click resolution.

Components that may be linked to the adjustment mechanism in particular may be optical sighting systems such as sighting telescopes. A connector part is used to link the adjustment mechanism to such components. Preferably this connector part is a threaded pin, a setscrew and the like. Any other arbitrary part may be used as the connector part provided it shall convert a rotary motion of the adjustment mechanism linked to said part into an adjustment displacement. Illustratively this connector part may be a spindle element and the like.

An adjusting muff is used to drive the adjustment mechanism and is supported in rotatable manner on the connector part. The adjusting muffs rotation is transmitted by the connector part to the component being adjusted. To make component adjustment easier to the user, the adjusting muff is linked to a first interlocking component. This lock means allows the user to monitor by touch whether interlocking is taking place. Each interlocking action is assigned to a corresponding adjustment. Especially in the case of a high number of interlocking actions—in other words, in the case of a wide range of adjustments—display means are used to assure accurate adjustment, said display means indicating whether a predetermined rotational excursion, or a predetermined rotational spot, has been reached when adjusting/rotating the adjusting muff. Arbitrarily many rotational points or rotational ranges may be defined within the bounds set by the display means geometries. Preferably the rotational range is adjusted in a manner than when having carried out a given number of interlocking procedures, a first rotational point or switching point shall have been reached and this feature shall then be indicated. Preferably this feature applies after completely performing all the interlocking procedures of one lock means when further interlockings may be carried out. In this manner one click array may be used in multiple manner in the adjustment method.

A second lock means is used to make sure the user/operator also may monitor the adjustments in darkness. The lock means each are fitted with lock elements to constitute an array of clicks. The first lock means comprises first lock elements to constitute a first array of clicks and the second lock means is fitted with second lock elements to constitute a second array of clicks. The arrays of clicks of the first and second lock are different. Preferably the array of clicks of the second lock means comprises larger click spacings, i.e. it is coarser, than the array of clicks of the first lock means. Then the first and second lock means snap-in simultaneously, the resistance against said lock means moving out is increased due to higher snap-in impedance, as a result of which the user can feel or sense such simultaneous or nearly simultaneous snap-in actions into the first and second interlock arrays. The lock elements may be constituted at different components or at one. Illustratively the first and second lock elements may be configured next to each other so as to be in the form of smaller and larger recesses and elevations respectively. Preferably however the lock elements shall be configured at different components or sites. The second, additional lock element makes it easier to the user to adjust because needing counting only fewer snap-in/interlock actions for a given adjustment than if there were only one lock means.

The present invention also includes the technical disclosure of the following constituents being included in an adjustment mechanism which adjusts components connected/connectable to it, in particular to adjust a sighting telescope's crosshair: an adjusting muff rotatably supported on a connector part and driving the adjustment mechanism the connector part being designed to transmit the adjusting muff displacement to the components connected/connectable to it in order to adjust said components, with a first lock means linked to the adjusting muff and fitted with first lock elements to constitute a first click array, display means to indicate the magnitude of adjusting the muff rotation, and a switch to drive the display means when the adjusting muff has been rotated by a predetermined rotation, the display means being displaceable relative to the adjusting muff and being linked in such manner to the switch that, in a first switch position, the display means assumes a first position and in the other switch position it assumes another (touch)-detectable position.

Accordingly the displaceable configuration relative to the adjusting muff allows detection even in darkness what the displacement means position is. In this manner, in addition to the first lock means, the user is provided with a checking means reducing the likelihood of erroneous adjustments in the dark.

The present invention moreover includes the technical disclosure that an adjustment mechanism to adjust components connectable to it, and in particular to adjust a sighting telescope's crosshairs, comprises the following: an adjusting muff rotatably supported on the connector part to drive the adjustment mechanism, said connector part being designed to transmit the displacement of the adjusting muff to components which can be linked to it in order to adjust said components, comprising a first lock means connected to the adjusting muff and fitted with first lock elements to subtend a first click array, display means to indicate the magnitude of the adjusting muff rotation, and a switch to drive said display means after the adjusting muff has been rotated by a predetermined excursion, the display means being displaceable relative to the adjusting muff and hence to the switch in a manner that at a first switch position the display means assumes a first position and at another switch position it assumes another, touch-detectable position, where a second lock means linked to the adjusting muff is fitted with second array of clicks different from the first click array, by means of second lock elements.

Besides the second lock means, this feature offers an additional way for the user to check even when in the dark for erroneous adjustments. Preferably the elements implementing such checking are integrated into the adjustment mechanism for compactness.

Preferably too, the second lock means comprises a first snap-in part, and cooperating with latter, a corresponding, second snap-in part, both said parts being designed to be engaged as needed. These two snap-in parts create a two-part lock means which can be manufactured in very simple manner and requires little space. This two-part design allows easy integration into the lock means and, also retrofitting.

In a preferred embodiment mode of the present invention, the first snap-in part is in the form of an interlocking annular slab. Such a slab is compact and optimal in shape at minimum size. Preferably too in this respect, the second snap-in part is an interlocking bush. This bush is easily manufactured and in particular in combination with the said slab offers optimal compactness, adjustability and accuracy.

In another preferred embodiment mode of the present invention, the lock elements of the first snap-in part are a recess and/or elevation and the lock elements of the second snap-in parts are corresponding elevations and recesses engaging the first lock elements. The recesses may assume any shape and in particular are milled out. The corresponding elevations are designed to engage at least partly the recesses and in this manner assure increased resistance following engagement during further displacement.

In another preferred embodiment mode of the present invention, the lock elements of the second snap-in part are spherical elevations and the lock elements of the corresponding first snap-in element are spherical recesses. In this manner the snap-in parts when not engaged are able to easily slide on a mating surface subtended with the corresponding recesses because, regarding the contact area, a sphere offers the optimal shape. Moreover the spherical geometry allows optimally defining the snap-in force with respect to snapping-in and "snapping out", namely lifting the engagement of the sphere. During engagement, the spherical elevation enters the corresponding spherical recess.

Preferably the diameter of the spherical elevation shall be larger than that of the spherical recess. In this manner the sphere will not completely move through the spherical recess when being engaged, but at most by half its diameter. The size of the diameter defines the force required to move the elevation out of its engaged position. One solution is attained by keeping the diameter differential between recess and elevation small, whereby less force is needed to "un-snap", whereas a larger differential entails a larger force.

Preferably again, the ratio of the first to the second click resolution is selected from the group of ratios: 1:2; 1:5; 1:10; 1:20; 1:25; 1:50; 1:100; 1:125; 1:150; 1:200; 1:250; 1:500; 1:750; 1:1000; 1:1250; 1:1500; 1:2000; 1:2500; 1:5000; 1:7500; 1:10000. In this manner conventional and easily converted scales may be offered to the user assuring simple operation. Clearly naturally arbitrary predeterminable scales or "click separations" of the lock elements must also be provided besides the scales above.

Preferably the second interlocking component furthermore comprises at least one mechanical, biasing element to prestress the snap-in parts against one another. The force to displace the snap-in parts relative to each other may be determined by said bias. A large bias entails more difficulty in displacing the snap-in parts relative to each other. If such a bias is substantial, the force needed for disengagement will be significantly raised.

In one preferred embodiment mode of the present invention, the second interlocking component comprises two prestressing elements exerting oppositely directed biases for the purpose of mutually biasing the snap-in parts. The force adjusting the interlocking component may be adjusted even more precisely using the second prestressing element. In this manner the prestressing elements may act in the same direction in order to reinforce the bias or in opposite directions so that the biases be at least partly mutually offsetting.

The present invention provides further that the prestressing elements be designed to exert different biases. In this way oppositely acting prestressing elements are precluded can not cancel out their biases. Moreover the second interlocking component also comprises a coupling element which is displaceable in and/or opposite a direction of action of the prestressing element and which is configured between a snap-in part and the adjusting muff. This coupling element allows mutually aligning or adjusting the prestressing elements. If there is only one prestressing element, the coupling element may be used as a spacer replacing the omitted prestressing element, eliminating thereby the need to both redesign and rebuild anew the entire adjustment mechanism, instead the same components/elements (except for the spacer) being suitable both for the adjustment mechanism fitted as well with one prestressing element as with two or more.

Preferably the prestressing elements are springs, especially compression springs.

Preferably the prestressing element exerting the larger bias shall be configured between the spacer and its nearby snap-in part. As a result, the bias' direction of action is determined. Because of this configuration, the bias, i.e. the related prestressing force, is applied from the spacer toward the prestressing elements.

To make it easier for the user to operate the adjustment mechanism, display means are provided to indicate the selected adjustment. Preferably the display means comprise an annular element fitted with a central borehole. As regards weight and compactness, this annular element is optimal when using the adjustment mechanism. Display markings preferably may be configured on the circumferential surface.

Preferably the annular element shall be configured on or in the adjustment mechanism in a manner that the adjusting muff. be fitted with an annular recess at least partly receiving said element. In this design the annular element is guided within and rotatable about an axis within the adjusting muff.

In one advantageous embodiment mode of the present invention, the annular element is fitted with an outer, first surface pointing away from the adjusting muff which in turn is fitted with at least one second surface that is enclosed by the annular recess and the offset between the two surfaces pointing toward said muff's surface, the offset of the two surfaces during the relative motion of the annular element to adjusting muff constituting a touch-detectable indication of the excursion of the rotation. Accordingly these two surfaces may be displaced relative to each other. This motion is linked to that of the adjusting muff and as a result, depending on the actuation or the adjusted position of the adjusting muff, the surfaces will be moved relative to each other.

In particular the present invention provides that the offset shall be situated within the range from the negative width of the annular element to its positive width. In this manner the total offset between the surfaces is determined by the width of the ring or annular element. The width is measured in the axial ring direction. In the above cited range, the offset may assume any value. This offset may assume both continuous values and discrete ones within the cited range.

This offset may be assumed in particular preferred positions. Such preferred positions are the fully retracted, fully extended positions and those at the center. Preferably the first display means position is that in which the offset is near zero. In that case the two surfaces —that of the adjusting muff and of the annular element—are flush next to each other. This position therefore is easily sensed also in the dark where the user will check for offsets by touch.

The other position may be any other position whereby the offset shall be other than zero, that is deviating from the flush position. As a result the user can easily sense by touch an adjustment away from the zero position.

In especially preferred manner, the other position shall be more than one position, the offset at any position differing from the other positions. In particular, three preferred positions may be implemented.

These positions and hence the offset, may be designed as a discrete distribution as already discussed above. In other words, the positions always impulsively jump from one to the other. In this manner only preferred positions may be sensed by the user.

Besides, and preferably, the positions and hence the offset are formed according to a constant distribution. As a result the position changes uniformly with each adjusting muff motion, whereby each change shall be transmitted directly.

The technical disclosure of the present invention furthermore provides a retrofitting kit to retrofit adjustment mechanisms used to adjust components linked to it, in particular to adjust a sighting telescope's crosshairs, comprising: a second lock means and/or display means of the invention. Based in such a solution, extant adjustment mechanisms are easily retrofitted and in particular the features of the invention may be implemented thereby.

The technical disclosure furthermore provides a sighting telescope fitted with an adjustment mechanism of the invention, furtherwith a tube housing fitted with tube mounts for an ocular and objective system and an optical inverting system fitted with an associated crosshair within it. The sighting telescope may be adjusted by the adjustment mechanism as a function of environmental conditions, and therefore an object sighted by the sighting telescope may be focused reliably and optimally. This procedure may be carried out using the adjustment mechanism of the present invention rapidly and silently, and definitely so in the dark too.

Again the disclosure of the present invention includes the case that a firing system be equipped with a firing element and sighting telescope of the invention. The design of said firing element is arbitrary and may be found in a gamut from medical means "firing" light or emitting laser beams for treatment to military fire arms. Transmission of signals such as light, particles, information or the like in any manner is understood to be included in "shooting".

The technical disclosure of the present invention also includes a method to adjust components linked to an adjustment mechanism of the invention and comprising the following stages: fine control of the adjustment mechanism due to the touch-detectable feedback from the first lock means, coarse adjustment of the adjustment mechanism due to the touch-detectable feedback from the first lock means, coarse adjustment of the adjustment mechanism due to the touch-detectable feedback from the second lock means, such steps being implemented as desired or called for also in the reverse sequence and/or simultaneously. In this manner adjustment may be carried out across large adjustment ranges even in the dark or in poor visibility. By means of the touch-perceived display means, the user preferably . . . .

Preferably again the method furthermore includes the stage of checking the adjustment mechanism's position using the display means of the invention, such checking being implemented at will.

Further features, details and advantages of the present invention are contained in the wording of the claims, also from the description below of illustrative embodiment modes discussed in relation to the appended drawings.

Figure 2:
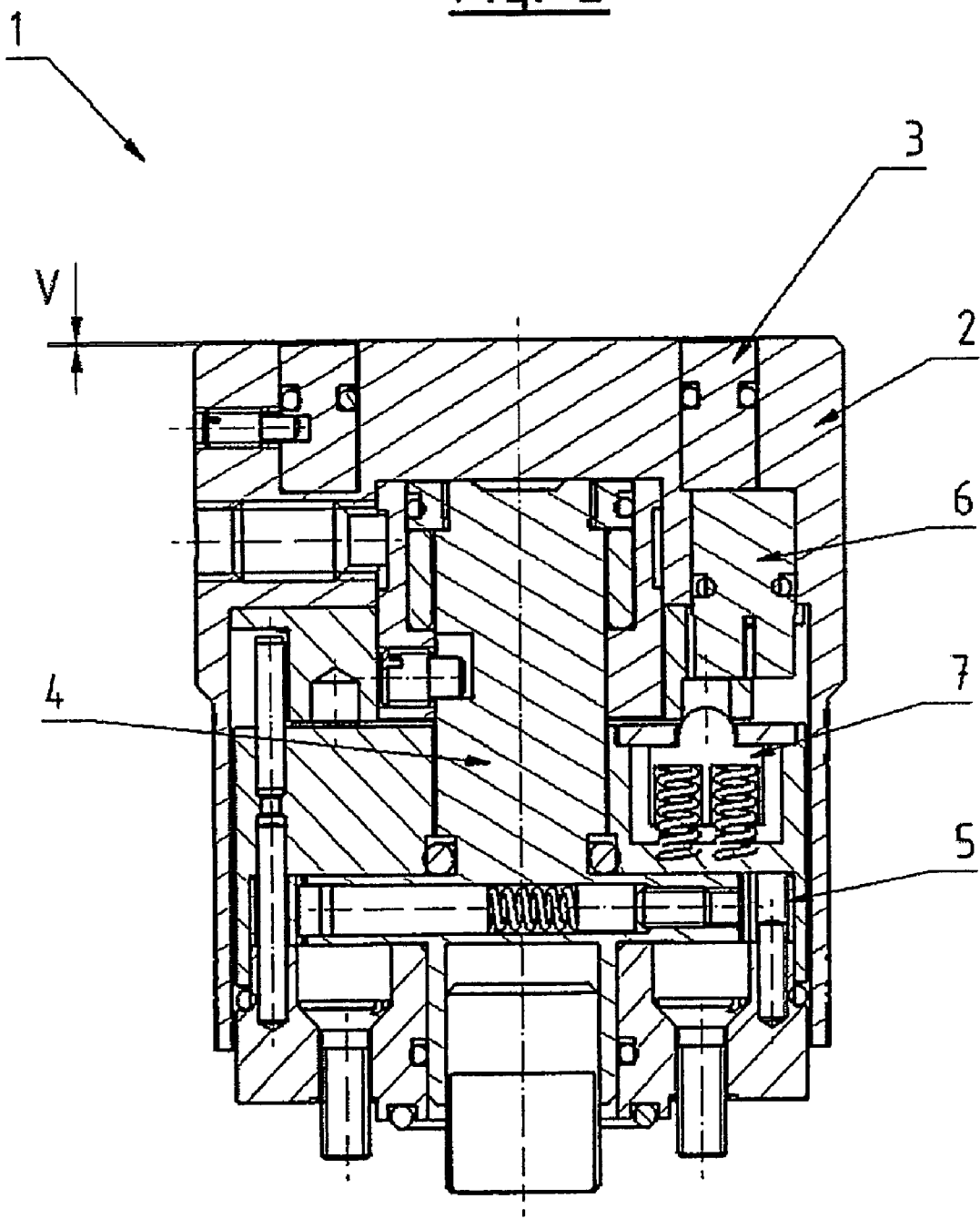
Figure 3:
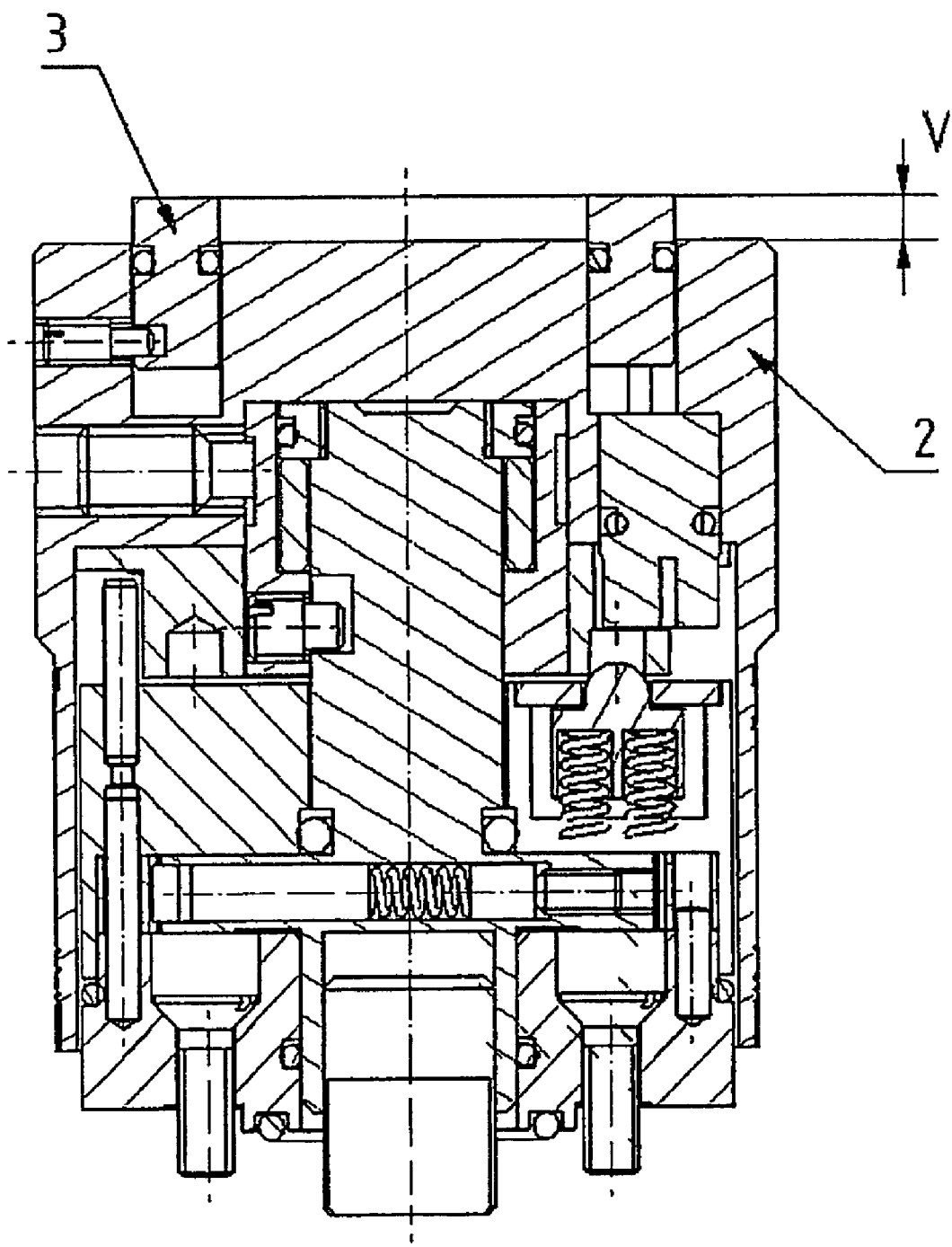
Figure 4:
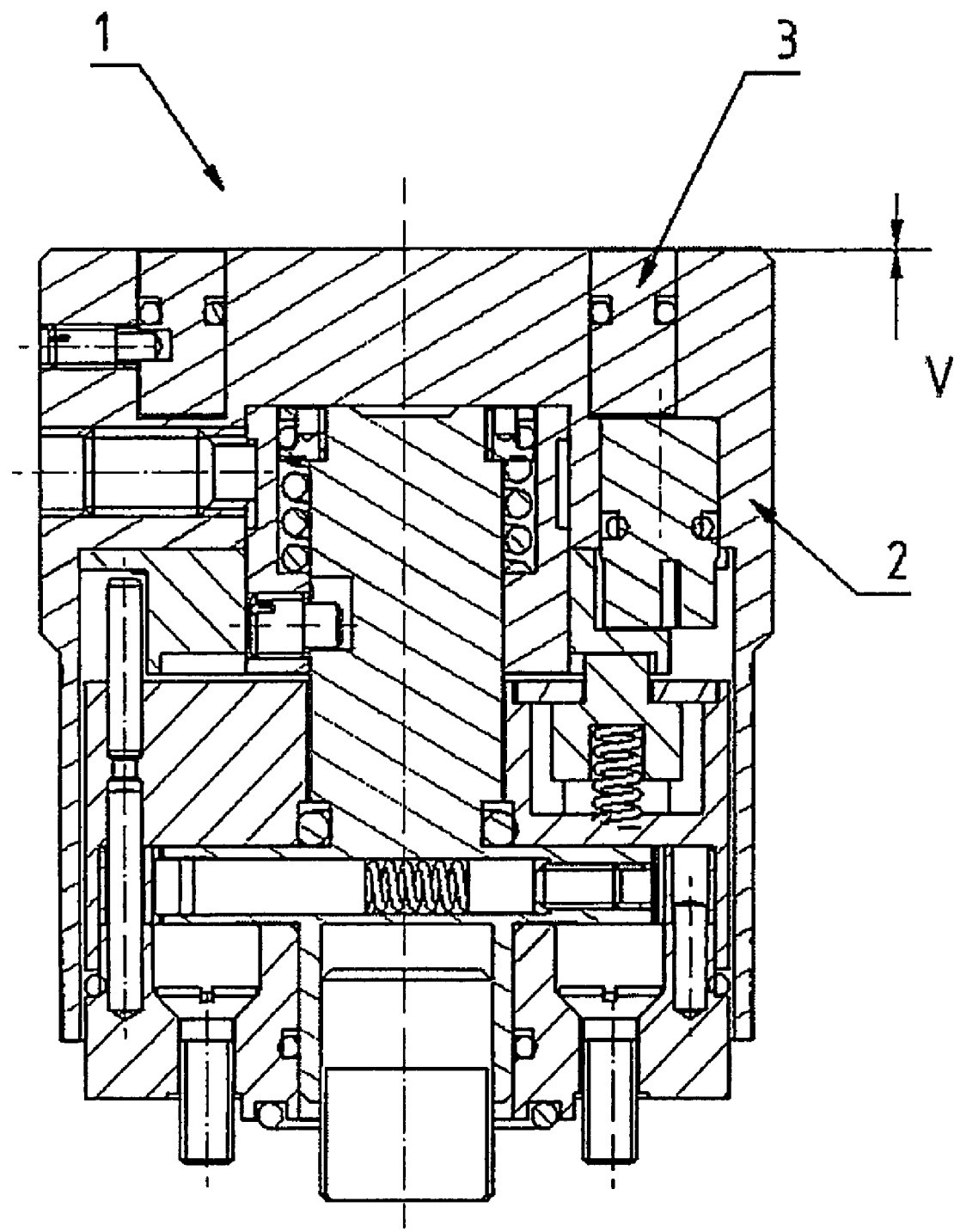
Figure 5:
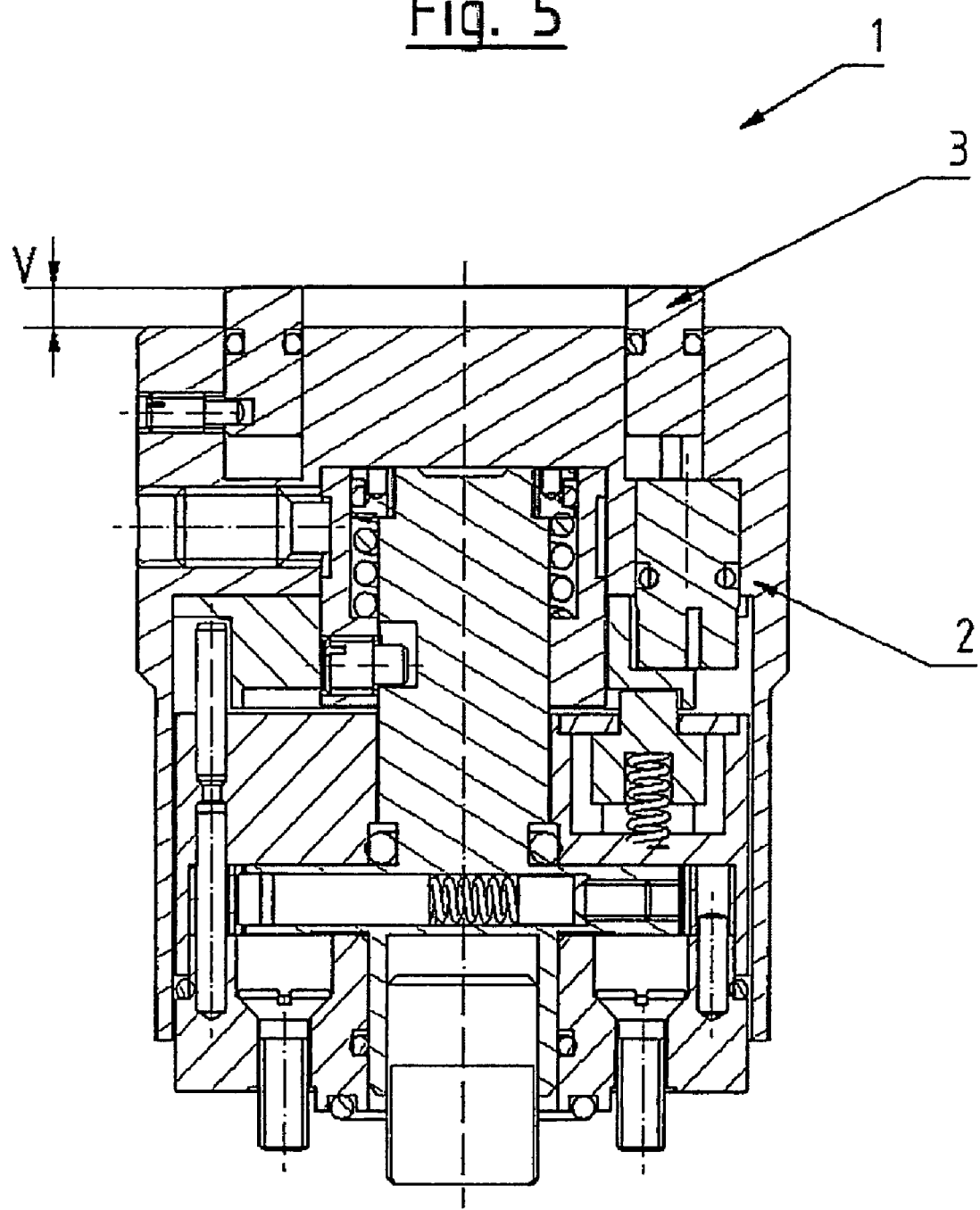
Figure 6:
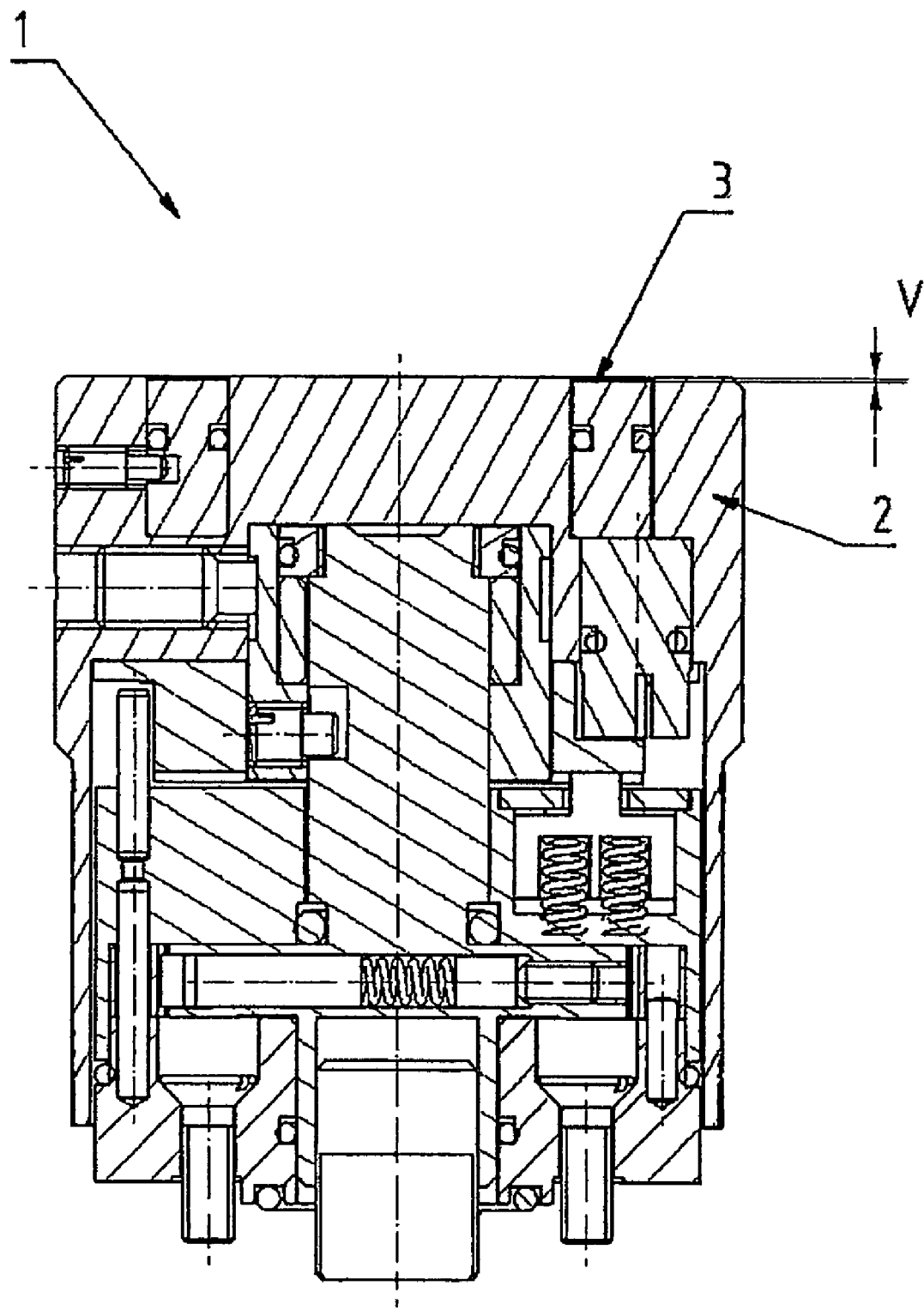
Figure 7:
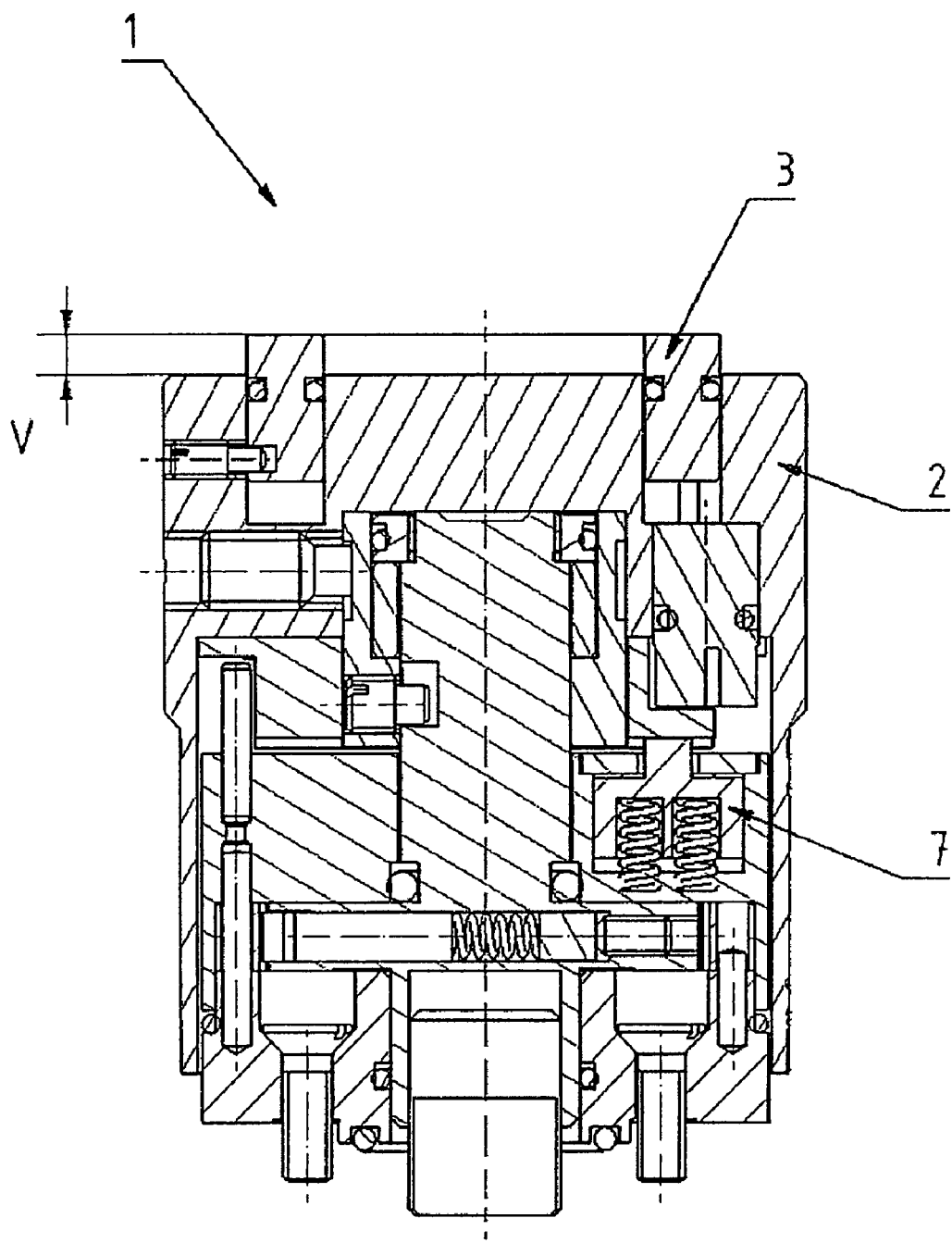

FIG. 1 is a front elevation of an adjustment mechanism of the present invention with a display means of which the offset is >0, FIG. 2 is a longitudinal section through a first embodiment mode of an adjustment mechanism of the present invention of which the offset is approximately zero, FIG. 3 is the longitudinal section of FIG. 2 at an offset >0, FIG. 4 is a longitudinal section through a second embodiment mode of the adjustment mechanism of the present invention at an offset of about zero, FIG. 5 is a longitudinal section as shown in FIG. 4 but at an offset >0, FIG. 6 is a longitudinal section through a third embodiment mode of an adjustment mechanism of the present invention at an offset of about zero, and FIG. 7 shows the longitudinal section of FIG. 6 at an offset >0.

FIG. 1 shows an adjustment mechanism 1 of the present invention. The adjustment mechanism 1 comprises an adjusting muff 2 driving the mechanism 1. Two annular scales A1 allowing accurate adjustment of the mechanism 1 are configured on the adjusting muff 2. To display which annular scale A1 is being used at any given time to adjust the mechanism 1, latter is also fitted with display means 3 which are designed as an element A2 displaceable relative to the adjusting muff 2 and which may project upwards out of the adjusting muff 2 or be retracted into it. The display means 3 is shown in an extended position to make it plain that the upper scale annulus A1 is being used to set the adjustment mechanism 1.

A connector part 4 projects downward from the adjusting muff 21 and links this adjustment mechanism 1 to further components such as telescope tubes and the like. The adjusting muff 2 is linked rotationally to the connector part 4. Accordingly the connector part 4 is used to transmit the displacement of the adjusting muff 2 to linked components. FIG. 2 elucidates the design of the adjusting muff 2.

FIG. 2 shows the adjustment mechanism 1 of the invention in longitudinal section. Besides the adjusting muff 2, the display means 3, the connector part 4, this adjustment mechanism 1 also comprises a first interlocking component 5 which is connected to the adjusting muff 2, further a switching element 6 and a second interlocking component 7. The first interlocking component 5 will lock in position at each scale graduation of one of the annular scales A1 shown in FIG. 1 and in this manner implements feedback to the user after latter has set a position defined by the annular scale A1. The second interlocking component 7 operates basically the same way as the first interlocking component 5 and is fitted with an interlocking annular slab A3 which is adjustable while being linked to the adjusting muff 2. As a result this interlocking annular slab A3 may be rotated/adjusted circumferentially. In order not to be restricted to one rotation, the interlocking annular slab A3 may be rotated arbitrarily often about its own axis and thereby it may be theoretically adjusted over an endless range. In order to limit the range of adjustment, the adjustment mechanism 1 is fitted with a switch 6 which in this case limits the number of revolutions to 2. In the present design, the switch 6 is connected in such manner to the display means 3 that approximately after one full revolution or depending on the setting when a switching position has been reached, the display means 3 shall be displaced commensurately and thereby will display that the switching position was reached. In the process the display means 3 then extends from the adjusting-muff 2 or retracts into it. FIG. 2 shows that position wherein the offset V between the outer surfaces of the display means 3 and of the adjusting muff 2 will be zero. FIG. 3 show a positive offset.

As discussed above, the adjustment mechanism 1 also comprises a second interlocking component 7. The latter is also connected to the adjusting muff 2 but, contrary to the case of the first interlocking component, its click pitch differs, so that, for instance, the second interlocking component 7 will interlock also only if the first interlocking component 5 has interlocked five times. Accordingly this second interlocking component 7 is a coarse or accessory means allowing fast if coarse adjustment.

FIG. 3 shows the longitudinal section of FIG. 2 at a positive offset V. The display means 3 is shown extending outside the adjusting muff 2.

Operation is as follows:

In a first illustrative embodiment mode, an interlocking annular slab A3 is configured at the underside of the adjusting muff 2. This interlocking annular slab A3 is fitted with a predetermined number of boreholes A4 which are mutually a predetermined distance apart. An interlocking bush A5 is situated near said boreholes A4. Both the upper zone of the interlocking bush A5 and the lower zone of this interlocking bush A5 are cylindrical and exhibit corresponding diameters. The top side of the interlocking bush A5 is fitted a spherical elevation or a spherical surface A6. The interlocking bush A5 is forced upward against the interlocking annular slab A3 by means of one or more compression springs A7. If now the adjusting muff 2 and hence the interlocking annular slab A3 is adjusted, i.e. rotated in a manner that one of the boreholes A4 of the interlocking annular slab A3 comes to be situated precisely above the interlocking bush A5, i.e. its spherical elevation A6, the latter "clicks" into the borehole A4 of the interlocking annular slab A3. This click or snap-in impulse is felt to the touch much more than the engagements of the first interlocking component 5. The outside diameter at the upper zone of the interlocking bush A5 and the spherical diameter of the election A6 are chosen larger than the inside diameter of the boreholes A4 of the interlocking annular slab 4, as a result of which only part of the top side A6 of the interlocking bush A5 may enter the corresponding borehole A4. If now the adjusting muff 2 should be rotated farther, this can only be accomplished with a force application larger than that needed to engage the first interlocking component 5. because now the interlocking bush A5 is displaced downward against the opposing compression springs A7. If the adjusting muff 2 is rotated farther and a further engagement site is attained and the lock elements A9 are made congruent, the process then shall be repeated.

In the above cited process, the adjusting muff 2 always remains in the lower, predetermined position.

FIG. 4 shows, in longitudinal section, another embodiment mode of the adjusting mechanism 1 of the invention. The adjustment mechanism 1 differs from the mechanism 1 of FIGS. 2 and 3 in that the design of the second interlocking component 7 is different. When there is interlocking, the adjusting muff 2 moves into a locked position from which it can be removed only by a corresponding opposite displacement. Details of this procedure are elucidated below.

FIG. 5 shows the longitudinal section of the adjustment mechanism 1 of FIG. 4 at a positive offset V, i.e. in an extended position. The display means 3 are moved out relative to the adjusting muff 2, as a result of which the particular upper outer surfaces are offset by V from each other.

The adjustment mechanism 1 shown in FIGS. 4 and 5 operates as follows:

In a further illustrative embodiment mode (FIGS. 4, 5), an interlocking annular slab A3 is configured at the underside of the adjusting muff 2, that is on that side pointing opposite the display means 3. This interlocking annular slab A3 is fitted with a predetermined number of lock elements A9 in the form of milled holes A8 configured at predetermined distances from each other. Preferably such distances are equal. The adjusting muff 2 is forced by a biasing element A10 by a compression spring A7 toward the connector part 4. An interlocking bush A5 corresponding to the interlocking annular slab A3 and situated underneath latter is forced by a biasing element A10 in the form of a compression spring A7 from below, that is toward the display means 3, against the interlocking annular slab A3. This second compression spring A7 is slightly more compliant than the first compression spring A7 that forces the interlocking annular slab A3 down, and as a result the adjusting muff 2 remains in the lower position. The cylindrical interlocking bush A5 is fitted at its upper end with a planar surface A11. If now the adjusting muff 2 is rotated in a manner that one of the milled apertures A8 comes to rest accurately above the interlocking bush A5, then this interlocking bush A5 will move into said aperture A8, whereby the adjustment mechanism 1 has been stopped, i.e. until it snapped into said aperture. To undo such locking, the adjusting muff 2 must be pulled upward against the force of the first compression spring A7 and be rotated farther. Following rotating the adjusting muff 2 by one pitch separation of the first interlocking component 5, or, in short, by one "click", the adjusting muff 2 may be released without there being danger the muff 2 shall engage again. The milled apertures A8 no longer are accurately situated above the interlocking bush A5 which as a result again shall be forced downward against the second compression spring A7. This procedure is repeated when the adjusting muff 2 is rotated further and another aperture A8 reaches the interlocking bush A5.

FIG. 6 is a longitudinal section in the axial direction of the adjustment mechanism 1. Essentially FIG. 6 differs from FIGS. 2 and 4 by a different design of the second interlocking component 7. This interlocking element 7 comprises an interlocking annular slab A3 and an interlocking bush A5. Both the interlocking element A3 and the interlocking bush A5 are fitted with mutually cooperating and matched lock elements A9. The lock elements A9 are constituted at the interlocking bush A5 as (a) tip(s) formed by two bevels. The lock elements A9 o the interlocking annular slab A3 are matching recesses A13 receiving the lock elements A9 of the interlocking bush A5. The adjustment mechanism 1 is shown in a position wherein the offset between the display means 3 and the adjusting muff 2 is approximately zero, that is, the two outer, upper surfaces—namely the one which is an annular element A2 in the form of the display means 3 and the other of the adjusting muff 2, are arrayed approximately flush with one another.

FIG. 7 shows the longitudinal section of FIG. 6 at an offset V>0. The offset V of the adjustment mechanism 1, namely between the adjusting muff 2 and the display means 3 is other than zero, that is, the display means is in an extended position which can be sensed by the user even in darkness.

The third illustrative embodiment mode operates as follows:

In a third embodiment mode, an interlocking annular slab A3 is constituted at the underside of the adjusting muff 2. This interlocking annular slab A3 is fitted with a predetermined number of lock elements A9 at a predetermined distance from each other. An interlocking bush A5 matches said interlocking annular slab A3 and cooperates with it. A lower part of this interlocking bush A5 is secured against rotation, denoted here by A14, in the form of a cross-sectionally rectangular bar A15 (both omitted here). In this manner the interlocking bush A5 is precluded from rotating and may be shifted only axially, namely upward or downward. One or more compression spring(s) A7 acting as biasing elements A10 force(s) the interlocking bush A5 upward against the interlocking, annular slab A3. At its upper part, the interlocking bush A5 comprises two slants constituting a tip A12. If next the adjusting muff 2 is rotated in a manner that one of the click elements of the interlocking annular slab A3 shall be positioned accurately above one of the lock elements of the interlocking bush A5, then the lock elements and the upper end of the interlocking bush A5 will be precisely aligned with one another, in other words the interlocking bush A5 moves into the locking element of the interlocking annular slab A3, namely, the interlocking bush A5 "clicks" into the interlocking annular slab A3. Such a "click" is substantially felt more strongly than the "clicks" of the first interlocking component 5 per se. A force larger than that required by the conventional first interlocking component "clicks" must be applied to rotate farther the adjusting muff 2 because now the interlocking bush A5 must again be displaced downward against the force of the compression spring(s) A7. When the adjusting muff 2 is rotated farther, this procedure is repeated every time another click array of the second interlocking component 7 that becomes congruent with the first click array.

In this procedure, the adjusting muff 2 always remains in the lower, predetermined position.

Operation of the display means 3 is discussed below:

In order to display to the user, operator and the like at any time, at least by touch, and where light conditions allow, also visibly, the switch position of the adjustment mechanism 1, display means 3 are used that preferably shall show the number of adjusted turns. To display the switch position of the adjustment mechanism 1, an annular element A2 adjustable relative to the adjusting muff 2 is used, said element A2 depending on its position revealing the corresponding switch position. Such positions illustratively may be flush with the top side of the adjusting muff 2 which they then close off, or they may project from the adjusting muff 2 or be retracted into it.

A display means 3 designed as a rotation ring A2 or more generally as an annular element A2 is configured in a corresponding recess A16 in the upper portion of the adjusting muff 2. The rotation ring A2 is positioned by means of at least one threaded pin(s), having a shank A17, set in slanted grooves A18 at the circumference of the annular element A2. When the annular element A2 is rotated about the center axis M of the adjusting muff 2, it is displaced axially, namely upward or downward, relative to said muff 2. Depending on the rotation of the adjusting muff 2, the display means 3 shall be in a corresponding position.

A projecting element 19A designed as a cylinder pin A20 and belonging to the switch 6 projects from the annular element A2. Said protrusion A19 cooperates with a pendulum cylinder A21 also belonging to the switch 6. The pendulum cylinder A21 is rotatable about its axis. A groove A22 is configured at the underside of the pendulum cylinder A21. A cylinder pin A20 projects from the top side of the pendulum cylinder A21, its axis being parallel to and laterally offset from, i.e. being excentric with the axis of the pendulum cylinder A21. A groove A22 is configured at the lower side of the pendulum cylinder A21 and guides the pin A23 projecting from the top side of said cylinder. When rotating the adjusting muff 2 beyond a switching point, for instance for a full turn, the cylinder pin A20 projecting from the annular element A2 will enter the groove A22 at the bottom of the pendulum cylinder A21, and as a result the position of the cylinder pin A20 projecting from the pendulum cylinder A21 will change. When the adjusting muff is rotated further, the pendulum cylinder 21 will rotate, causing the position of the cylinder pin A20 projecting from said pendulum cylinder to change. Consequently the annular element A2 will rotate and is guided through the oblique grooves A22 upward or downward, in general axially. The oblique grooves A22 may be configured at the circumference of the annular element A2 in different positions for two or more switch positions.

The invention is not restricted to one of the above discussed embodiment modes but instead may be modified in versatile manner.

All features and advantages, whether explicit or implicit, based on the claims, the discussion and the drawings, including design details, spatial configurations and method stages, should be construed significant to the present invention whether considered per se or in arbitrary combinations.

The invention claimed is:

1. An adjustment mechanism (1) to adjust components to which it can be connected, in particular to adjust a telescope sighting system, comprising an adjusting muff (2) rotatably supported on a connector part (4) to drive the adjustment mechanism (1), the connector part (4) being designed to transmit the motion of the adjusting muff (2) to its connected components in order to adjust them, comprising a first interlocking component (5) linked to the adjusting muff (2) and fitted with first lock elements (A9) to constitute a first click array, further display means (3) to indicate the excursion of rotation of the adjusting muff (2), and a switch (6) to actuate the displays (3) following a predetermined rotational excursion of the adjusting muff (2), a second interlocking component (7) linked to the adjusting muff (2) being provided that is fitted with a second click array—different form the first click array—constituted by second lock components (A9).

2. An adjustment mechanism (1) to adjust its connected components, in particular to adjust a telescope sighting system, comprising an adjusting muff (2) rotatably supported on a connector part (4) to drive the adjustment mechanism (1), the connector part (4) being designed to transmit the motion of the adjusting muff (2) to components which can be connected to it in order to adjust said components, comprising a first interlocking component (5) linked to the adjusting muff (2) and fitted with first lock elements (A9) to constitute a first click array, further display means (3) to display the excursion of rotation of the adjusting muff (2), and a switch (6) to actuate the display means (3) following a predetermined rotational excursion of the adjusting muff (2), the display means (3) being displaceable relative to the adjusting muff (2) and linked in a manner to the switch (6) that at a first switch position the display means (3) assumes a first position and at another switch position the display means (3) assumes another position which can be sensed by touch.

3. An adjustment mechanism (1) to adjust components with which it can be connected, in particular to adjust a telescope sighting system, comprising an adjusting muff (2) rotatably supported on a connector part (4) to drive the adjustment mechanism (1), the connector part (4) being designed to transmit to connectable components the motion of the adjusting muff (2) in order to adjust said components, comprising a first interlocking component (5) linked to the adjusting muff (2) and fitted with first lock elements (A9) to constitute a first click array, further display means (3) to display the excursion of rotation of the adjusting muff (2), and a switch (6) to actuate the displays (3) following a predetermined rotational excursion of the adjusting muff (2), the display means (3) being displaceable relative to the adjusting muff (2) and linked in a manner to the switch (6) that at a first switch position, the display means (3) assumes a first position and at another switch position the display means (3) assumes another position which can be sensed by touch, and where a second interlocking component (7) linked to the adjusting muff (2) fitted with a second click array—different from the first click array—constituted by two second lock components (A9).

4. Adjustment mechanism (1) as claimed in claim 1, characterized in that the second interlocking component (7) comprises both a first snap-in part and a second snap-in part corresponding to and cooperating with said first part, said parts being designed to engage one another.

5. Adjustment mechanism (1) as claimed in claim 1, characterized in that the first snap-in part is an interlocking annular slab (A3).

6. Adjustment mechanism (1) as claimed in claim 2, characterized the second snap-in part is an interlocking bush (A5).

7. Adjustment mechanism (1) as claimed in claim 1, characterized in that the lock elements (A9) of the first snap-in part are designed as a recess (A4, A8, A13) and/or an elevation (A6, A11, A12) and the lock elements (A9) of the second snap-in part are designed as elevations (A6, A11, A12) and/or (recesses (A4, A8, A13) corresponding to and engageable with the first snap-in parts.

8. Adjustment mechanism (1) as claimed in claim 1, characterized in that the lock elements (A9) of the second snap-in part are designed as spherical elevations (A6) and the snoopin parts (A9) of the corresponding first snap-in part are designed as spherical recesses (A4).

9. Adjustment mechanism (1) as claimed in claim 8, characterized in that the diameter of the spherical elevation (A6) is larger than that of the spherical recess (A4).

10. Adjustment mechanism (1) as claimed in claim 1, characterized in that the ratio of the first click pitch to the second click pitch is selected from the group of ratios :1:2,1:5, 1:10, 1:20, 1:25, 1:50, 1:100, 1:125, 1:150, 1:200, 1:250, 1:500, 1:500, 1:750, 1:1000,1:1250,1:1500, 1:2000, 1:2500, 1:5000, 1:7500; 1:10000.

11. Adjustment mechanism (1) as claimed in claim 1, characterized in that the second interlocking component (7) further comprises at least one prestressing element (A10) in order to bias the snap-in parts against each other.

12. Adjustment mechanism (1) as claimed in claim 1, characterized in that the second interlocking component (7) comprises two biasing elements (A10) designed with oppositely acting biases in order to bias the snap-in parts against one another.

13. Adjustment mechanism (1) as claimed in claim 12, characterized in that the biasing elements (A10) are designed with different biasing forces.

14. Adjustment mechanism (1) as claimed in claim 1, characterized in that the second interlocking component (7) further comprises a coupling displaceable in and/or opposite the direction of the force of the biasing element (A10) and configured between a snap-in part and the adjusting muff (2).

15. Adjustment means (1) as claimed in claim 12, characterized in that the biasing element (A10) exerting the larger bias force is configured between the connector part and the near-by snap-in part.

16. Adjustment means (1) as claimed in claim 1, characterized in that the display means (3) comprises an annular element (A2) fitted with a central, continuous borehole.

17. Adjustment mechanism (1) as claimed in claim 1, characterized in that the adjusting muff (2) comprises an annular recess (A16) at least partly receiving the annular element (A2).

18. Adjustment mechanism (1) as claimed in claim 1, characterized in that the annular element (A2) comprises an outer first surface pointing axially away from the adjusting muff (2) and a second surface pointing toward the surface of the adjusting muff (2)

19. Adjustment mechanism as claimed in claim 1, characterized in that the offset (V) is situated within the range from the negative value of the width of the annular element (A2) to the positive value of the width of the annular element (A2).

20. Adjustment mechanism (1) as claimed in claim 1, characterized in that the first position of the display means (3) is a position wherein the offset (V) is about zero.

21. Adjustment mechanism (1) as claimed in claim 1, characterized in that the other position is a second position wherein the offset (V) is other than zero.

22. Adjustment mechanism (1) as claimed in claim 1, characterized in that the other position includes more than one position wherein the offset (V) in each position is different from that in the other positions.

23. Adjustment mechanism (1) as claimed in claim 1, characterized in that the positions and hence the offset (V) are due to a discrete distribution.

24. Adjustment mechanism (1) as claimed in claim 1, characterized in that the positions and hence the offset (V) are due to a constant distribution.

25. A retrofitting kit to retrofit adjustment mechanisms (1), to adjust components which can be connected to the adjustment mechanism (1), in particular to adjust a telescope sighting system, comprising a second interlocking component (7) and/or at least one display means (3) as claimed in claim 1.

26. A sighting telescope fitted with an adjustment mechanism (1) as claimed in claim 1, comprising a tube housing containing tube mounts for an ocular and objective system and an optical inverting system receiving an associated crosshair.

27. Firing system comprising a firing device and a sighting telescope as claimed in claim 26.

28. A method to control components linked to an adjustment mechanism (1) as claimed in claim 1, comprising the stages:
    fine control of the adjustment mechanism (1) using the detectable feedback from the first interlocking component (5),
    coarse control of the adjustment mechanism (1) using the detectable feedback from the second interlocking component (7),
    where the sequence of the above stages also may be inverted.

29. Method as claimed in claim 28, further comprising the stage:
    checking the position of the adjustment mechanism (1) using the display means (3), where such checks may be carried out any time during the implementation of the method.

* * * * *